Patented May 24, 1949

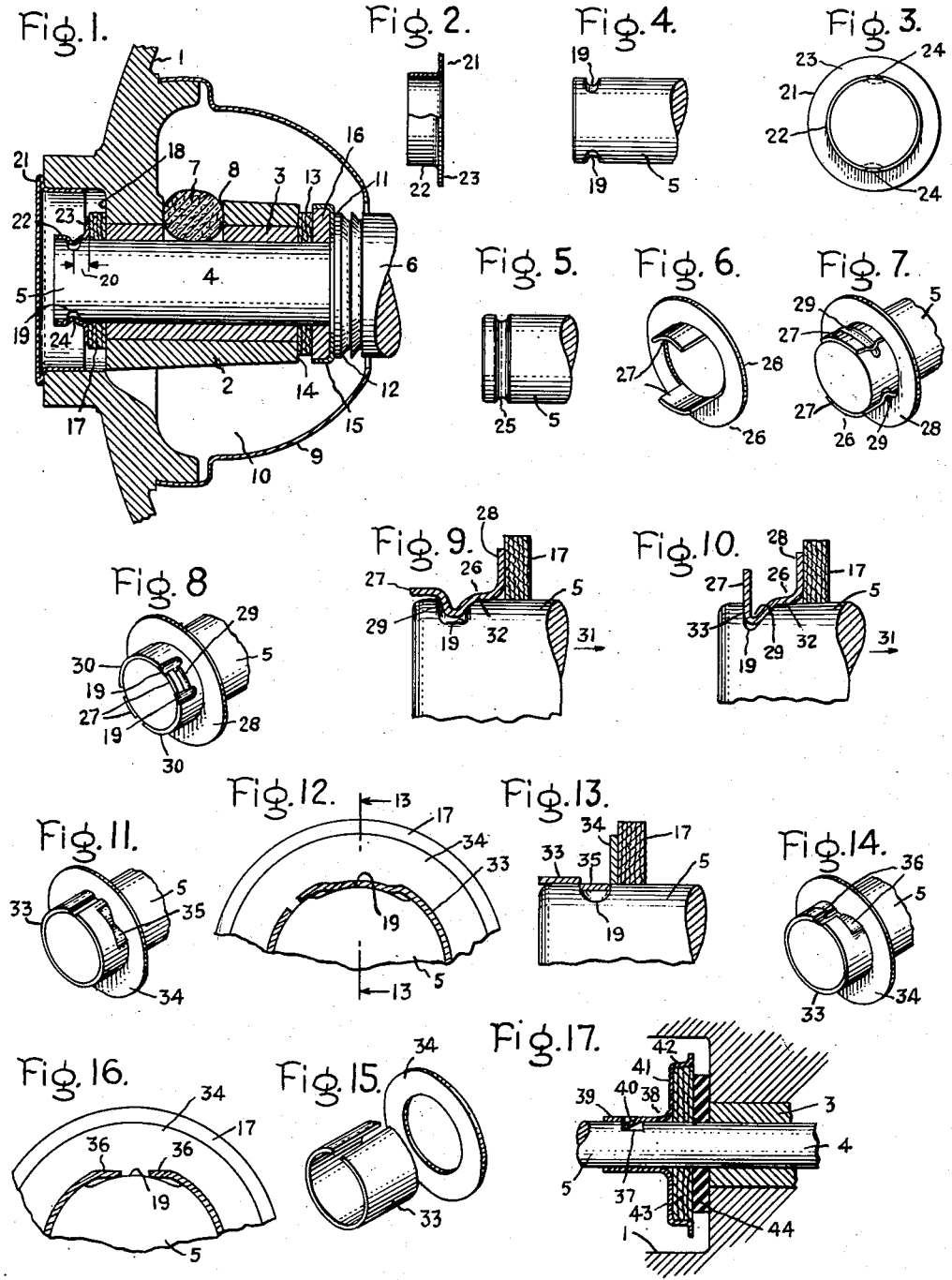

2,471,180

UNITED STATES PATENT OFFICE 2,471,180

MECHANISM FOR ADJUSTING SHAFT END PLAY

Lawrance W. Wightman, Fort Wayne, Ind., assignor to General Electric Company, a corporation of New York Application September 24, 1948, Serial No. 50,945

12 Claims. (Cl. 308—161)

1

This invention relates to apparatus having rotatable shafts and more specifically to means for adjusting axial end play of rotatable shafts.

In the manufacture of rotating equipment having two bearings, such as dynamoelectric machines, it has been customary to limit the axial end play of the shaft by holding it in place between the bearings by the use of shaft shoulders with combinations of shim washers of various thicknesses. This involves a complicated trial and error assembly program to select the proper shim washers and, since the tolerances accumulate between the bearings, it is still difficult to hold the axial end play of the shaft within desirable limits. In the case of dynamoelectric machines having centrifugal switch actuating mechanisms mounted on the shaft, excessive axial end play increases the required switch setting and causes difficulty in securing a centrifugal mechanism which will actuate the switch at the proper speeds. It is, therefore, desirable to provide a simple means for adjusting the axial end play of a shaft and for holding the end play within narrow limits.

An object of this invention is to provide improved means for limiting axial end play of a rotatable shaft.

Another object of this invention is to provide improved means for adjusting the axial end play of a rotatable shaft and for holding the end play within desired limits.

Further objects and advantages of this invention will be better understood from the following description referring to the accompanying drawing. The features of novelty which characterize this invention will be pointed out with particularity in the claims annexed to and forming a part of this specification.

In one aspect of this invention, a rotatable shaft is held in place by locking it around one bearing instead of holding it between two bearings. A shoulder is provided on the shaft on one side of the bearing and a transverse groove is formed in the shaft at the other end of the same bearing. The only variable dimension, therefore, is the distance between the groove and its associated bearing side. An eyelet member is provided having a cylindrical portion positioned on the shaft over the groove and an annular flange portion. The axial end play of the shaft is adjusted after assembly of the machine to the desired amount and a part of the cylindrical portion of the eyelet is then crimped into engagement with the groove. The flange portion of the eyelet limits axial end play of the shaft and its

2 location with respect to the crimped part is determined by the desired end play adjustment.

In the drawing, Fig. 1 is a cross sectional view, partly in section, of a portion of a dynamoelectric machine end shield and bearing with the shaft being provided with one embodiment of this invention; Figs. 2 and 3 illustrate the eyelet member of Fig. 1; Fig. 4 illustrates the grooving of the shaft of Fig. 1; Fig. 5 illustrates another type of groove which may be utilized with this invention; Figs. 6 and 7 illustrate another form of the eyelet member of this invention; Fig. 8 illustrates a modification of the embodiment of Figs. 6 and 7; Figs. 9 and 10 illustrate two methods of crimping the eyelet of the embodiments of Figs. 1 through 8; Figs. 11, 12 and 13 illustrate a further embodiment of this invention utilizing a two-part eyelet with a split ring portion and a separate washer portion; Figs. 14, 15 and 16 illustrate a modification of the embodiment of Figs. 11, 12 and 13; and Fig. 17 shows the utilization of the eyelet member of this invention as a retainer cup for a thrust washer and as an oil thrower.

Referring now to Fig. 1, there is shown a portion of the end shield 1 of a dynamoelectric machine having a bearing support 2 with a sleeve bearing 3 mounted therein. A shaft 4 is rotatably seated in the bearing 3 and has extensions 5 and 6 extending beyond the bearing on both sides thereof. The bearing is lubricated by a wick 7 formed of absorbent material positioned in a transverse opening 8 in the bearing support 2 and bearing 3. A cup-shaped member 9 is secured to the end shield 1 and surrounds the bearing forming a lubricant reservoir 10. A shoulder 11 is formed on the shaft extension 6 for limiting axial movement of the shaft in the direction of the shaft extension 5 and a plurality of lubricant throwing grooves 12 are cut or otherwise formed on this shaft extension to throw any lubricant which may pass through the bearing and along the shaft centrifugally against the cup-shaped member 9 and into the lubricant reservoir 10. A standard thickness lubricating washer 13 is positioned on the shaft extension 6 abutting the end 14 of the bearing and bearing support and a cup-shaped lubricant throwing washer 15 is positioned between lubricating washer 13 and the shaft shoulder 11 and is supported by a standard thickness washer 16. Another standard thickness lubricating washer 17 is positioned on the shaft extension 5 abutting the end 18 of the bearing and bearing support. It will now be readily seen that the only tolerances in this structure accumulate from the shaft shoulder 11 through the cup washer 15, supporting washer 16, lubricating washer 13, the bearing 3, and the lubricating washer 17.

In order to provide for simple adjustment of the axial end play of the shaft 4 after its assembly in the bearing and to limit the axial end play to a predetermined amount, the arrangement now to be described and shown in Figs. 1 through 4 is provided. A pair of diametrically opposed transverse grooves 19 are cut or otherwise formed in the outer periphery of the shaft extension 5 equally spaced from the washer 17. This provides a variable dimension 20 between the grooves 19 and the lubricating washer 17 which is determined by the tolerances recited above. An eyelet member 21 is provided having a cylindrical portion 22 positioned on the shaft extension 5, extending over the grooves 19, and an annular flange portion 23 abutting the lubricating washer 17 for limiting axial movement of the shaft in the direction of the shaft extension 6 when the eyelet member is secured to the shaft extension 5. The axial end play of the shaft is adjusted to the desired amount and a part 24 of the cylindrical portion 22 of the eyelet 21 is then crimped into engagement with the grooves 19 to secure the eyelet to the shaft extension 5. Thus the spacing between the crimped part 24 and the annular flange portion 23 is determined only after assembly of the shaft in the bearing to provide a predetermined amount of axial end play. The eyelet 21 has no definite predetermined location with respect to the grooves 19, its location being determined only by the end play requirement. It will be readily apparent that the tolerances involved between the shaft shoulder 11 and the lubricating washer 17 are less than those which would be accumulated by holding the shaft between two bearings, and the sum of these tolerances is readily taken up by the variable dimension 20.

In the construction of dynamoelectric machines of fractional horsepower frame size, it was found that the best practical limits for end play with the shaft held between two bearings was .005 inch to .020 inch, the latter being an excessive end play for centrifugal switch adjustment. By utilizing the improved crimped eyelet of this invention with the shaft held around one bearing, it was found that the end play could be easily held from .005 inch to .010 inch. Furthermore, the end play adjustment can now be made after the machine is assembled thus saving the time which was formerly taken to select shim washers of appropriate thickness. In the actual assembly operation, a crimping tool can be used which is located on the end of the shaft extension 5 so that the crimp is always directly into the grooves 19 even though the cylindrical portion 22 of the eyelet covers the grooves, the variable dimension 20 being first adjusted to give the proper end play before the crimp is made. The end play adjustment of this invention is superior to a spring or screw end play limiting arrangement since it is adjustable until fixed, and once fixed is solidly secured with no chance of looseness as with a screw or pressed fit, and with no constant drag or variation of end play with axial pressure as with a spring arrangement. If it is desired, an annular groove 25 can be cut, rolled or otherwise formed on the shaft extension 5, as shown in Fig. 5, instead of the two transverse grooves 19 of Figs. 1 and 4.

In the embodiment of Figs. 1, 2 and 3, once the eyelet member 21 has been crimped into engagement with the grooves 19 of the shaft extension 5, it is permanently secured and cannot be removed without permanent distortion. Thus, if the machine is to be disassembled, on reassembly the end play must again be adjusted and a new eyelet crimped on the shaft extension. In Figs. 6 and 7, there is shown a modified form of eyelet which can be readily removed from the shaft extension and when reassembled retains the same end play adjustment. Here, the eyelet 26 is provided with two diametrically opposed axially extending portions 27 and an annular flange portion 28. The axially extending portions 27 respectively embrace the shaft extension 5 and, when the proper end play adjustment has been made, as described above, a part 29 of each axially extending portion 27 is respectively crimped into engagement with the grooves 19. This eyelet is readily disassembled from the shaft extension 5 by merely twisting it with respect to the shaft extension so that the crimped parts 29 of the axially extending portions 27 ride up and out of the grooves 19. In Fig. 8 there is shown a further modification of the eyelet of Figs. 6 and 7, which in addition to the diametrically opposed axially extending portions 27, is also provided with another pair of diametrically opposed axially extending portions 30 intermediate the portions 27. The two axially extending portions 30 embrace the shaft extension 5, but are utilized for alignment only, the two portions 27 being respectively crimped at 29 to engage the slots 19 after adjustment of the axial end play.

Referring now to Fig. 9, which shows in detail the engagement of the part 29 of Fig. 7 with the groove 19, it will be readily seen that axial movement of the shaft extension 5 in the direction shown by the arrow 31 places a compressive force on the section 32 of the eyelet 26 and, particularly with the eyelet form shown in Figs. 6, 7 and 8, excessive axial pressure may cause the crimped parts 29 to become disengaged from the grooves 19. In Fig. 10 the edge 33 of the groove 19 is formed at 90° to the center line of the shaft and thus, the crimping of the part 29 into the groove 19 causes the end of the axial projection 27 to be vertical instead of parallel to the shaft. Here increased axial end pressure in the direction shown by the arrow 31 merely causes the crimp 29 to become tighter as compression of the portion 32 increases until that portion fails completely as a column.

Referring now to Figs. 11, 12 and 13, there is shown another embodiment of this invention utilizing a two-part eyelet formed of a split ring portion 33 and a separate washer portion 34. Here, after assembly of the shaft in the bearing, the end play is adjusted to the desired limits and the washer 34 is placed on the shaft extension 5 abutting the lubricating washer 17. The split ring portion 33 is then positioned on the shaft extension 5 over the groove 19 to engage the washer 34. The part 35 of the split ring 33 is then sheared into the groove 19 to secure the ring to the shaft extension 5. This embodiment provides a much longer effective spring length permitting ready disassembly and reassembly of the same ring on the same shaft without distortion of the ring or the use of special tools. The end play adjustment principle of this embodiment is identical with the previously described embodiments.

In Figs. 14, 15 and 16 there is shown a modification of the embodiment of Figs. 11 through 13 in which parts 36 of the two axial edges of the ring 33 are sheared into engagement with the groove 18.

Referring now to Fig. 17, there is shown a modified form of the improved eyelet member of this invention. Here, the stationary frame member 1 supports a bearing 3 in which the rotatable shaft 5 is seated. The shaft extension 5 has a straight transverse milled cut 37 formed on one side. An eyelet member 38 having a cylindrical portion 39 is positioned on the shaft extension 5. The eyelet member 38 is provided with an annular portion 41 and a cup portion 42 which serves as a retainer for the standard thickness thrust washer 43. A lubricating washer 44 is positioned between the thrust washer 43 and the bearing 3. After the end play of the shaft 4 has been properly adjusted, as described above, a part 40 of the cylindrical portion 39 of the eyelet member 38 is crimped into engagement with the slot 37. It can now be readily seen that the eyelet member 38 not only provides the improved end play adjustment feature of this invention, but that the cup portion 42 also serves as an oil thrower and as a retainer for the thrust washer 43. This modification utilizing only one sheared part is particularly adaptable for use on life-time lubricated machines where the eyelet will not be removed and where a lubricant throwing device is also desired. It will be understood that the retainer cup and lubricant thrower feature of Fig. 17 can be utilized with any of the various forms of eyelet shown in the previous figures.

It will now be readily apparent that this invention provides a quick and simple arrangement for adjusting the end play of a shaft after the assembly of the shaft in the bearing. While this invention has been described as adapted to adjust the end play of a two-bearing device, it will be readily apparent that it is ideally suited for the end play adjustment of a unit bearing structure.

While there is illustrated and described particular embodiments of this invention, modifications thereof will occur to those skilled in the art. I desire it to be understood, therefore, that this invention is not to be limited to the particular arrangements disclosed, and I intend in the appended claims to cover all modifications which do not depart from the spirit and scope of this invention.

What I claim as new and desire to secure by Letters Patent of the United States is:

1. In combination, a bearing, a shaft rotatably supported by said bearing and extending on both sides thereof, means on one extension of said shaft for preventing axial movement of said shaft in the direction of the other shaft extension, said other shaft extension having a groove formed in its outer periphery at right angles to the axis of said shaft and spaced from said bearing, and means having one portion positioned on said other shaft extension extending over said groove and another portion adapted to prevent axial movement of said shaft toward said one shaft extension when said last-mentioned means is secured to said other shaft extension, said one portion having a part crimped into engagement with said groove for securing said last-mentioned means to said other shaft extension, said other portion being spaced from said crimped part by a distance which provides a predetermined amount of axial end play between said other portion and said bearing whereby the axial end play of said shaft can be adjusted to a predetermined amount by the location of said crimped part with respect to said other portion.

2. In combination, a bearing, a shaft rotatably supported by said bearing and extending on both sides thereof, a shoulder formed on one extension of said shaft for preventing axial movement thereof in the direction of the other shaft extension, said other shaft extension having a groove formed in its outer periphery at right angles to the axis of said shaft and spaced from said bearing, and an eyelet member having a cylindrical portion positioned on said other shaft extension extending over said groove and an annular portion adapted to prevent axial movement of said shaft toward said one shaft extension when said eyelet member is secured to said other shaft extension, said cylindrical portion having a part crimped into engagement with said groove for securing said eyelet to said other shaft extension, said annular portion being spaced from said crimped part by a distance which provides a predetermined amount of axial end play between said annular portion and said bearing whereby the axial end play of said shaft can be adjusted to a predetermined amount by the location of said crimped part with respect to said annular portion.

3. In combination, a bearing, a shaft rotatably supported by said bearing and extending on both sides thereof, a shoulder formed on one extension of said shaft for preventing axial movement thereof in the direction of the other shaft extension, said other shaft extension having a groove formed in its outer periphery at right angles to the axis of said shaft and spaced from said bearing, and an eyelet member having a cylindrical portion positioned on said other shaft extension extending over said groove and an annular portion adapted to prevent axial movement of said shaft toward said one shaft extension when said eyelet member is secured to said other shaft extension, said cylindrical portion having a plurality of parts crimped into engagement with said groove for securing said eyelet to said other shaft extension, said annular portion being spaced from said crimped parts by a distance which provides a predetermined amount of axial end play between said annular portion and said bearing whereby the axial end play of said shaft can be adjusted to a predetermined amount by the location of said crimped parts with respect to said annular portion.

4. In combination, a bearing, a shaft rotatably supported by said bearing and extending on both sides thereof, a shoulder formed on one extension of said shaft for preventing axial movement thereof in the direction of the other shaft extension, said other shaft extension having a plurality of transverse grooves formed in its outer periphery equally spaced from said bearing, and an eyelet member having a cylindrical portion positioned on said other shaft extension extending over said groove and an annular portion adapted to prevent axial movement of said shaft toward said one shaft extension when said eyelet is secured to said other shaft extension, said cylindrical portion having a plurality of parts respectively crimped into engagement with said grooves for securing said eyelet to said other shaft extension, said annular portion being spaced from said crimped parts by a distance which provides a predetermined amount of axial end play between said annular portion and said bearing whereby the axial end play of said shaft can be adjusted to a predetermined amount by the location of said crimped part with respect to said annular portion.

5. In combination, a bearing, a shaft rotatably supported by said bearing and extending on both sides thereof, a shoulder formed on one extension of said shaft for preventing axial movement thereof in the direction of the other shaft extension, said other shaft extension having an annular groove formed in its outer periphery from said bearing, and an eyelet member having an axially extending portion embracing said other shaft extension extending over said groove and an annular portion adapted to prevent axial movement of said shaft toward said one shaft extension when said eyelet is secured to said other shaft extension, said axially extending portion having a part crimped into engagement with said groove for securing said eyelet to said other shaft extension, said annular portion being spaced from said crimped part by a distance which provides a predetermined amount of axial end play between said annular portion and said bearing whereby the axial end play of said shaft can be adjusted to a predetermined amount by the location of said crimped part with respect to said annular portion.

6. In combination, a bearing, a shaft rotatably supported by said bearing and extending on both sides thereof, a shoulder formed on one extension of said shaft for preventing axial movement thereof in the direction of the other shaft extension, said other shaft extension having a groove formed in its outer periphery at right angles to the axis of said shaft and spaced from said bearing, and an eyelet member having an axially extending portion embracing said other shaft extension extending over said groove and an annular portion adapted to prevent axial movement of said shaft toward said one shaft extension when said eyelet is secured to said other shaft extension, said axially extending portion having a part crimped into engagement with said groove for securing said eyelet to said other shaft extension, said annular portion being spaced from said crimped part by a distance which provides a predetermined amount of axial end play between said annular portion and said bearing whereby the axial end play of said shaft can be adjusted to a predetermined amount by the location of said crimped part with respect to said annular portion.

7. In combination, a bearing, a shaft rotatably supported by said bearing and extending on both sides thereof, a shoulder formed on one extension of said shaft for preventing axial movement thereof in the direction of the other shaft extension, said other shaft extension having a plurality of transverse grooves formed in its outer periphery equally spaced from said bearing, and an eyelet member having a plurality of axially extending portions embracing said other shaft extension extending over said grooves and an annular portion adapted to prevent axial movement of said shaft toward said one shaft extension when said eyelet is secured to said other shaft extension, said axially extending portions each having a part respectively crimped into engagement with said grooves for securing said eyelet to said other shaft extension, said annular portion being spaced from said crimped parts by a distance which provides a predetermined amount of axial end play between said annular portion and said bearing whereby the axial end play of said shaft can be adjusted to a predetermined amount by the location of said crimped parts with respect to said annular portion.

8. In combination, a bearing, a shaft rotatably supported by said bearing and extending on both sides thereof, a shoulder formed on one extension of said shaft for preventing axial movement thereof in the direction of the other shaft extension, said other shaft extension having two transverse grooves formed in its outer periphery equally spaced from said bearing, and an eyelet member having two diametrically opposite axially extending portions embracing said other shaft extension and two other diametrically opposite axially extending portions embracing said other shaft extension intermediate said first-mentioned two portions, said portions extending over said groove, said eyelet member having an annular portion adapted to prevent axial movement of said shaft toward said one shaft extension when said eyelet is secured to said other shaft extension, said other two portions each having a part respectively crimped into engagement with said grooves for securing said eyelet to said other shaft extension, said annular portion being spaced from said crimped parts by a distance which provides a predetermined amount of axial end play between said annular portion and said bearing whereby the axial end play of said shaft can be adjusted to a predetermined amount by the location of said crimped parts with respect to said annular portion.

9. In combination, a bearing, a shaft rotatably supported by said bearing and extending on both sides thereof, a shoulder formed on one extension of said shaft for preventing axial movement thereof in the direction of the other shaft extension, said other shaft extension having a transverse groove formed in its outer periphery spaced from said bearing, and an eyelet member having an axially split ring portion positioned on said other shaft extension extending over said groove and a separate washer portion abutting said ring portion and said bearing adapted to prevent axial movement of said shaft toward said one shaft extension when said ring portion is secured to said other shaft extension, said ring portion having a part crimped into engagement with said groove for securing said eyelet to said other shaft extension, said washer portion being spaced from said crimped part by a distance which provides a predetermined amount of axial end play between said washer portion and said bearing whereby the axial end play of said shaft can be adjusted to a predetermined amount by the location of said crimped part with respect to said washer portion.

10. In combination, a bearing, a shaft rotatably supported by said bearing and extending on both sides thereof, a shoulder formed on one extension of said shaft for preventing axial movement thereof in the direction of the other shaft extension, said other shaft extension having a transverse groove formed in its outer periphery spaced from said bearing, and an eyelet member having an axially split ring portion positioned on said other shaft extension extending over said groove and a separate washer portion abutting said ring portion and said bearing adapted to prevent axial movement of said shaft toward said one shaft extension when said ring portion is secured to said other shaft extension, a part of each axial edge of said ring portion being crimped into engagement with said groove for securing said ring portion to said other shaft extension, said washer portion being spaced from said crimped parts by a distance which provides a predetermined amount of axial end play between said washer portion and said bearing whereby the axial end play of said shaft can be adjusted to a predetermined amount by the location of said crimped parts with respect to said washer portion.

11. In combination, a bearing, a shaft rotatably supported by said bearing and extending on both sides thereof, means on one extension of said shaft for preventing axial movement of said shaft in the direction of the other shaft extension, said other shaft extension having a groove formed in its outer periphery at right angles to the axis of said shaft and spaced from said bearing, and means having one portion positioned on said other shaft extension extending over said groove and another portion adapted to prevent axial movement of said shaft toward said one shaft extension when said last-mentioned means is secured to said other shaft extension, said one portion having a part crimped into engagement with said groove for securing said last-mentioned means to said other shaft extension, said other portion being spaced from said crimped part by a distance which provides a predetermined amount of axial end play between said other portion and said bearing whereby the axial end play of said shaft can be adjusted to a predetermined amount by the location of said crimped part with respect to said other portion, said other portion being cup-shaped to act as a lubricant thrower.

12. In combination, a bearing, a shaft rotatably supported by said bearing and extending on both sides thereof, a shoulder formed on one extension of said shaft for preventing axial movement thereof in the direction of the other shaft extension, said other shaft extension having a groove formed in its outer periphery at right angles to the axis of said shaft and spaced from said bearing, and an eyelet member having a cylindrical portion positioned on said other shaft extension extending over said groove and an annular portion adapted to prevent axial movement of said shaft toward said one shaft extension when said eyelet member is secured to said other shaft extension, said cylindrical portion having a part crimped into engagement with said groove for securing said eyelet to said other shaft extension, said annular portion being spaced from said crimped part by a distance which provides a predetermined amount of axial end play between said annular portion and said bearing whereby the axial end play of said shaft can be adjusted to a predetermined amount by the location of said crimped part with respect to said annular portion, said annular portion being cup-shaped to act as a lubricant thrower.

LAWRANCE W. WIGHTMAN.

No references cited.